(12) United States Patent
Flenley et al.

(10) Patent No.: US 6,405,317 B1
(45) Date of Patent: Jun. 11, 2002

(54) SECURITY MODULE FOR A TRANSACTION PROCESSING SYSTEM

(75) Inventors: John Martin Flenley; Stuart Currie, both of Havant; Philip James Atkin, Portsmouth, all of (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/225,802

(22) Filed: Jan. 5, 1999

(30) Foreign Application Priority Data

Jan. 30, 1998 (GB) .............................................. 9801931

(51) Int. Cl.[7] .............................. G06F 1/00; G06F 12/14
(52) U.S. Cl. ........................ 713/200; 713/201; 705/68; 705/382
(58) Field of Search ................................ 713/200, 201, 713/202, 159; 705/68, 67, 71; 380/277; 707/10, 100; 235/380, 492, 382; 703/13, 21, 22, 24

(56) References Cited

U.S. PATENT DOCUMENTS 5,764,789 A * 6/1998 Pare, Jr. et al. ............. 382/115
5,813,009 A * 9/1998 Johnson et al.
6,092,202 A * 7/2000 Veil et al. .................... 713/201
6,275,785 B1 * 8/2001 Currie et al. .................. 703/13

FOREIGN PATENT DOCUMENTS

| EP | 0 442 838 | 8/1991 |
| EP | 0 442 839 | 8/1991 |
| EP | 0 447 339 | 9/1991 |
| GB | 2 288 676 | 10/1995 |

* cited by examiner

Primary Examiner—Ly V. Hua
(74) Attorney, Agent, or Firm—Louis P. Herzberg

(57) ABSTRACT

A security module (95) for a transaction processing system is disclosed. The transaction processing system includes a transaction manager (20) which runs in a first process and is responsive to transaction requests from one or more applications (10, Page_1.htm) and a service provider layer (30, 36, 37) adapted to relay transaction requests passed from said transaction manager to associated hardware (14) for execution. The security module is adapted to communicate with a supervisor application to receive and store application rights to execute transaction requests and is responsive to requests from the service provider layer to determine an application's right to execute a transaction request.

11 Claims, 7 Drawing Sheets

SECURITY MODULE FOR A TRANSACTION PROCESSING SYSTEM

FIELD OF THE INVENTION

The present invention relates to a security system for a transaction processing system.

BACKGROUND OF THE INVENTION

WOSA/XFS (Windows Open Services Architecture for Extended Financial Services) is an emerging standard enabling financial institutions, whose branch and office solutions run on the Windows NT platform, to develop applications independent of vendor equipment.

FIG. 1 shows the standard WOSA model. Using this model, an application 10 communicates hardware requests 12 to various hardware devices in an ATM 14 via a WOSA manager 20. The application issues transaction requests 12 which are hardware independent, and thus vendor independent. The requests are queued by the WOSA manager 20 which manages concurrent access to the ATM hardware 14 from any number of applications 10.

When a piece of hardware is installed on the ATM, it registers its controlling software, known as a service provider module (SPM) 30, with the WOSA manager by using, for example, the Windows registry. The WOSA manager 20 is thus able to relay a hardware request 12 to an appropriate SPM 30, using the Windows registry as a look-up table. The SPM 30 takes relayed hardware independent requests 16 from the WOSA manager and actuates the appropriate piece of hardware to process the requests. The results of a request can be returned by an SPM 30 synchronously via the WOSA manager 20 or asynchronously by generating a Windows event.

A number of companies other than the Applicant, including Microsoft Corporation, Keybank Incorporated of Cleveland, Ohio and Diebold Incorporated of Canton, Ohio have mooted the idea of using an automatic teller machine (ATM) to provide access to Internet services, for example, for executing financial transactions, ticket reservation and information retrieval.

It is an object of the present invention to provide a security system for a transaction processing system.

DISCLOSURE OF THE INVENTION

Accordingly, the present invention provides a security system for a transaction processing system in which a transaction manager runs in a first process and is responsive to transaction requests from one or more applications and a service provider layer is adapted to relay transaction requests passed from said transaction manager to associated hardware for execution; said security system comprising: a security module adapted to store application rights to execute transaction requests; and a supervisor application adapted to register with said security module, said supervisor application being adapted to communicate with the or each application to determine application rights to execute transaction requests and to store said access rights in said security module; wherein the security module is responsive to requests from the service provider layer to determine an application's right to execute a transaction request.

It will be seen that the security system according to the invention enables a supervisor application to deny to other applications certain services provided by other peripheral SPMs controlling hardware in a simple and efficient manner.

In a second aspect the invention provides a transaction processing system including: a transaction manager running in a first process and responsive to transaction requests from one or more applications; a service provider layer including a set of service provider modules, each service provider module being adapted to relay transaction requests passed from said transaction manager to an associated hardware module; a security module adapted to store application rights to execute transaction requests; a supervisor application adapted to register with the security module, said supervisor application being adapted to communicate with the or each application to determine application rights to execute transaction requests and to store said access rights in said security module; wherein said service provider layer is adapted to communicate with said security module to determine if an application has appropriate access rights before executing a transaction request.

The invention further provides an ATM including the transaction processing system according to the invention.

DESCRIPTION OF THE PREFERRED EMBODIMENTS

Figure 1:
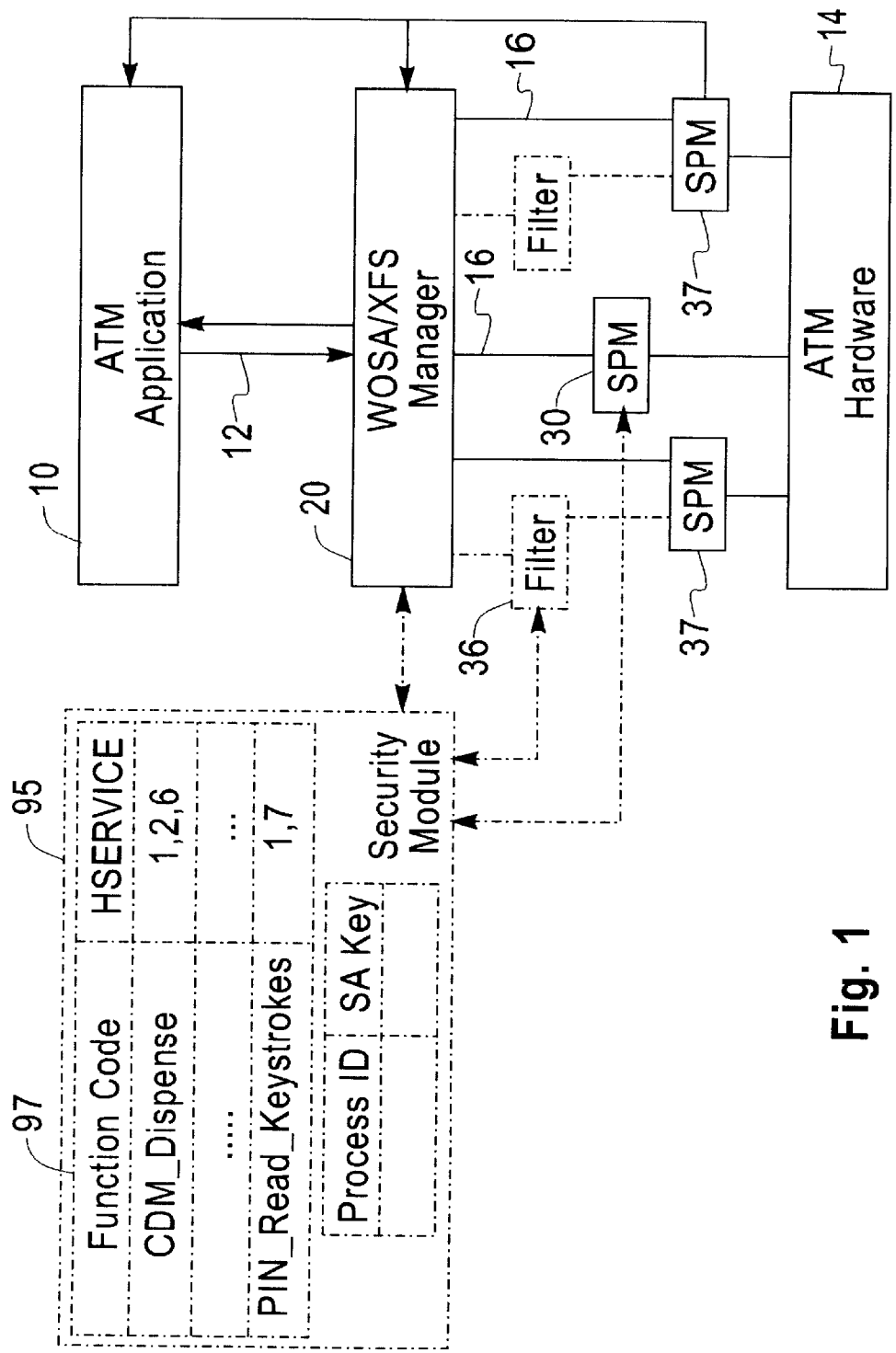
FIG. 1 shows a standard WOSA single process transaction processing system including a security system according to an aspect of the invention (shown shaded)

The standard WOSA model includes three layers, FIG. 1. An application layer 10 issues transaction requests in the form of hardware independent Application Programming Interface (API) calls 12 to a WOSA Manager 20 layer in order to access services from a Service Provider 30, 37 layer. All components exist within the same process (the Application's) and memory address space.

WOSA is a classic single process model, where all components of the solution run in the same process. If a single thread within this process abends, it will normally take the entire process down. Although this is acceptable in non-critical applications, for example printing, it is not acceptable where security is involved and where detailed audit trails are required. The best example of this case is where ATM cash dispensing is involved. If the process abends while a dispense is taking place, the error needs to be recoverable in order to determine the disposition of the cash involved.

Figure 2:
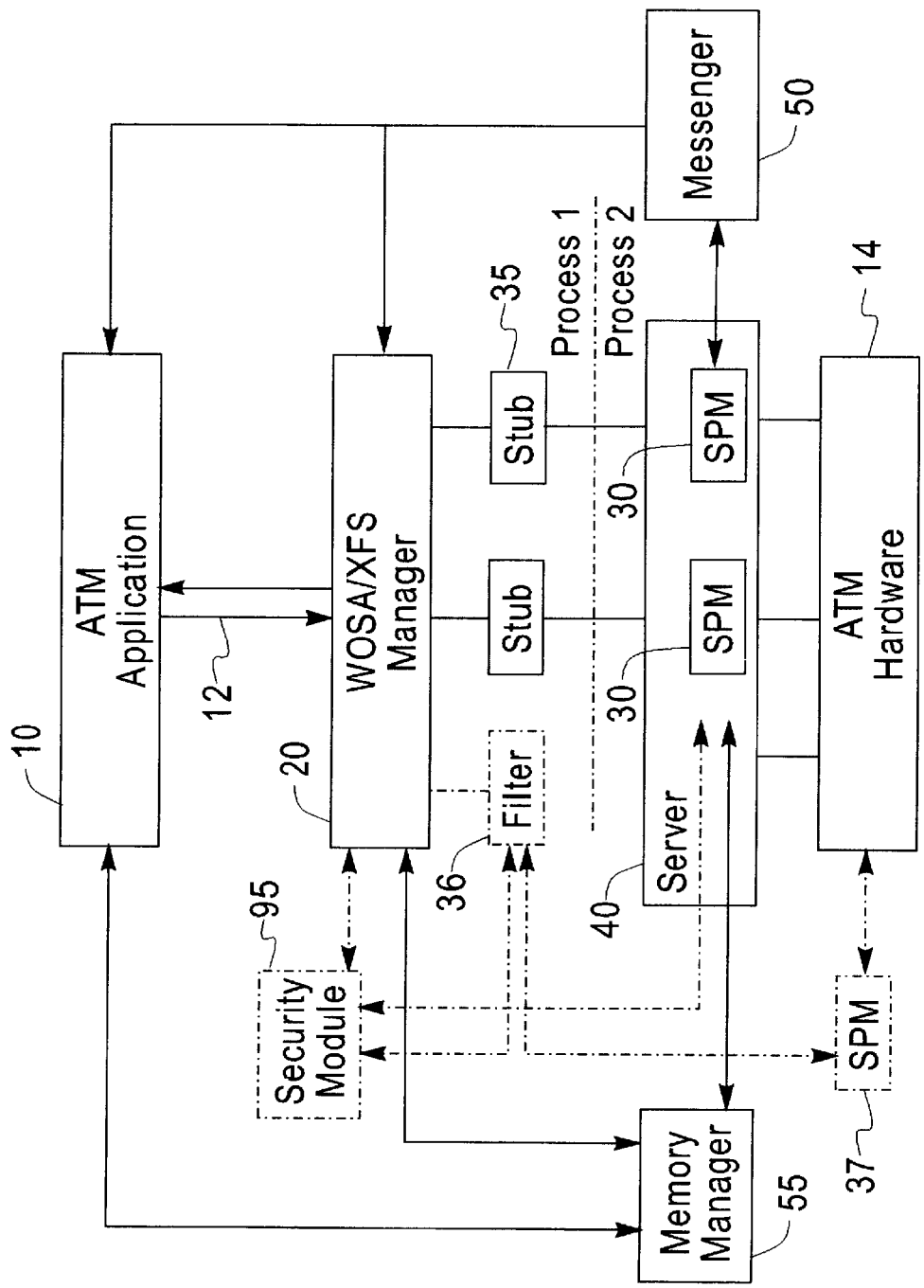
FIG. 2 shows an alternative transaction processing system including a security system according to an aspect of the invention (shown shaded)

In an alternative server model, FIG. 2, the application 10 and WOSA Manager 20 exist within the same user application process. The WOSA manager 20, however, communicates with stub Dynamic Link Libraries (DLLs) 35 each corresponding to a respective SPM 30 of FIG. 1. Transaction requests 12 from the application layer 10 pass through the WOSA Manager 20 to the stub DLLs 35, where the data is repackaged and passed across process boundaries to a server 40 running in a separate process, where the required transaction request is actually executed. The server 40 communicates with SPM's 30 to execute the transaction request, and any execution results are either passed back from the SPMs to the application 10 through the WOSA manager 20, via the stub DLLs 35, or via an operating system messenger 50. In a Windows NT operating system embodiment of the invention, the SPMs 30 generate windows events using an application nominated window handle, whereas in an embodiment of the invention using IBM's OS/2 operating system, the SPMs generate presentation manager events to communicate directly with an application 10.

The method of response is determined by the application 10, depending on whether a transaction request issued is specified as synchronous (the server responds through the stub DLL mechanism) or asynchronous (the server responds via the Windows Event mechanism).

Information is also accessible by both the application 10 and the SPMs using shared memory. When, for example, an SPM 30 wishes to transmit information to an application 10, the SPM sends a WOSA call to the WOSA manager 20 which communicates with an operating system memory manager 55 to allocate the shared memory. Once allocated, then SPMs 30 in the server 40 process or applications 10 can read or write information from this shared memory.

Figure 3:
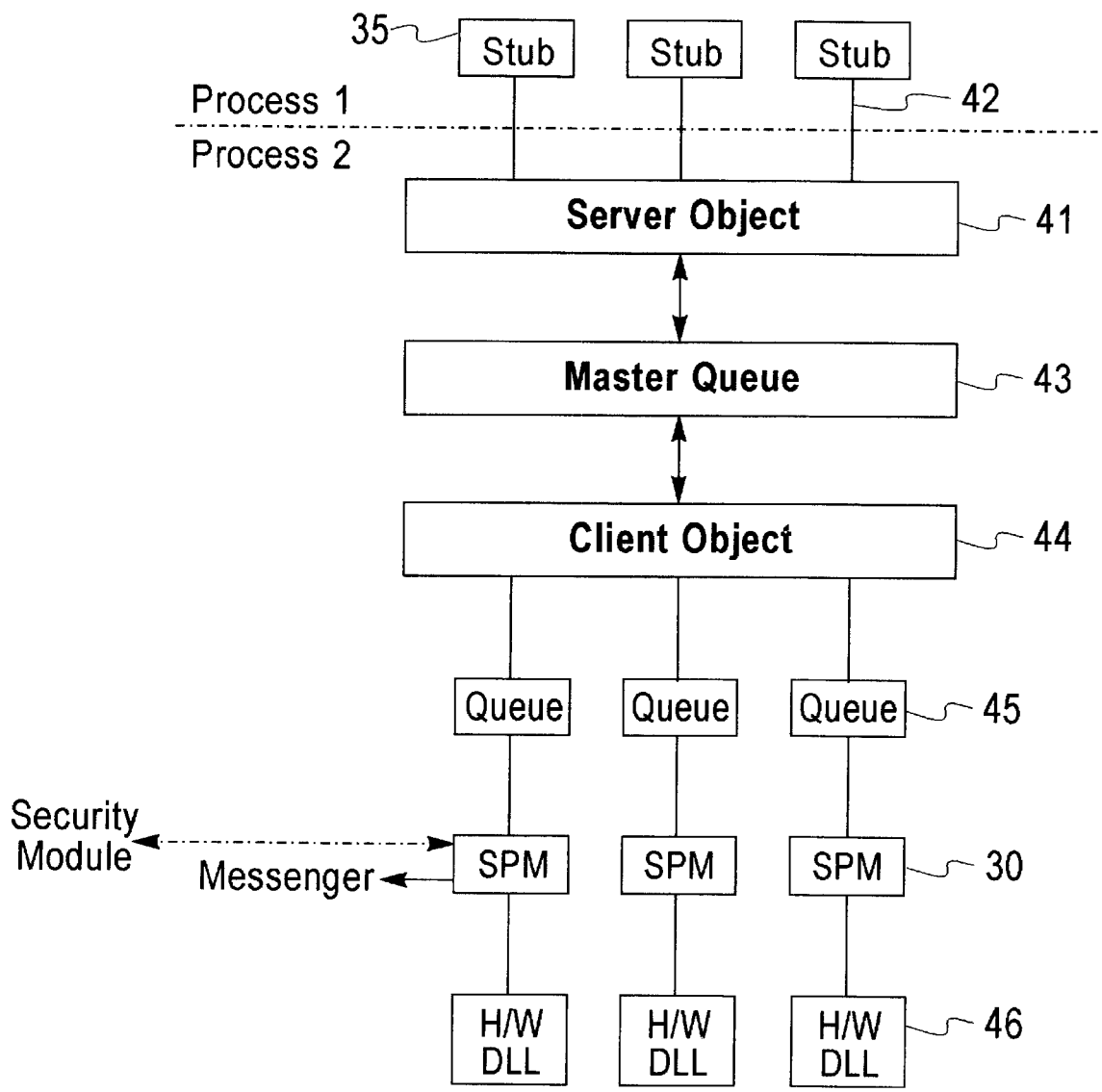
FIG. 3 shows a server component of the transaction processing system of FIG. 2 in more detail.

FIG. 3, shows the server 40 in more detail. The server is a multi-threaded application supporting the simultaneous execution of transaction requests on all of its supported WOSA device classes explained below. The server 40 consists of the following major components:

A server object 41 runs in its own thread and has responsibility for creating and monitoring memory 'pipes' 42 connecting the server process to respective stub DLLs 35, running in the user application process. When the server object detects a transaction request packet from one of the stub DLLs 35 waiting in its associated 'pipe' 42, it moves the packet into a master queue 43 and thus frees the pipe for more communications. The server also detects packets in the master queue 43 that are response packets from service provider modules 30, and channels these back through the 'pipes' to the correct stub DLL 35, which then passes the response back to the user application 10 via the WOSA Manager. The memory pipes 42 are implemented in a class including essentially three methods: readPipe( ), writePipe( ), queryPipe( ) with the methods being passed an identifier corresponding to the stub DLL associated with the pipe. In the application process, a stub DLL 35 receives a WOSA transaction request from the transaction manager and calls the writePipe method to place the request in its pipe 42. writePipe essentially writes a message to a designated location in shared memory with a flag indicating that the message needs to be read. Once the stub DLL 35 has written the message to the pipe, it then polls its pipe 42 continually using queryPipe to determine when a response has been sent from the server 41 or if the message has been read.

Within the server process, the server object 41 continually polls each of the pipes 42 using the queryPipe method for each pipe in turn to determine if messages are waiting to be processed. If a pipe has a message, the server calls readPipe to read the message from the pipe, resets the message flag indicating that the message has been read and places the message in the master queue 43. The server also interrogates the master queue 43, and if a message for the server 41 is in the master queue 43, the server 41 pops the messages from the queue and calls writePipe to place the message in the appropriate pipe and thereafter reverts back to querying the pipe for the next message.

A client object 44 runs in its own thread and is responsible for creating and managing the supported service provider modules 30 below it. The client object 44 monitors the server master queue 43 and when it detects an inbound packet for one of its managed hardware devices, it moves the packet from the queue 43 on to a private queue 45 associated with a target device.

Instances of service provider module objects 30 are created at startup time by the client. In the case of an ATM, objects would be instantiated for a journal printer, receipt printer, passbook printer, statement printer, deposit unit, cash dispenser, magnetic card reader/smart card reader, sensors and indicators unit, pinpad unit, encryptor unit, vendor dependant mode (VDM) unit, and text terminal unit. Each instantiation spawns its own control thread that is responsible for monitoring its own private queue 45 for requests that are placed there by the client object 44. When an SPM object 30 detects a request waiting on its private queue 45, or if there is a request pending execution and it is time to attempt to process pending requests again, the SPM object spawns an execution thread that handles the execution of that single request. The execution thread has the responsibility of processing the request to its conclusion, either returning the relevant data to the caller application 10 via events, marking the request as 'pending' on the queue 45 and completing, or returning a response by returning a completed packet back to the server queue 43 for transmission to the stub DLL 35 associated with that hardware device.

Each SPM 30 converts all WOSA transaction requests into one or more generic commands that are processed by a layer of small hardware DLLs 46. An Application Programming Interface (API) for each type of hardware device is published by the hardware vendor and consists of the minimum number of hardware level commands (example read_card on a magnetic stripe reader device, or dispense_ cash on a dispenser) that can satisfy the complete set of WOSA transaction requests for that device type. For example, a respective hardware DLL is supplied for both an IBM Dispenser and an Olivetti dispenser. The user only has to change which DLL is active, by updating the Windows registry in order to switch between the different devices. At the application and server layers, nothing changes. The same is true for all device types.

Figure 4:
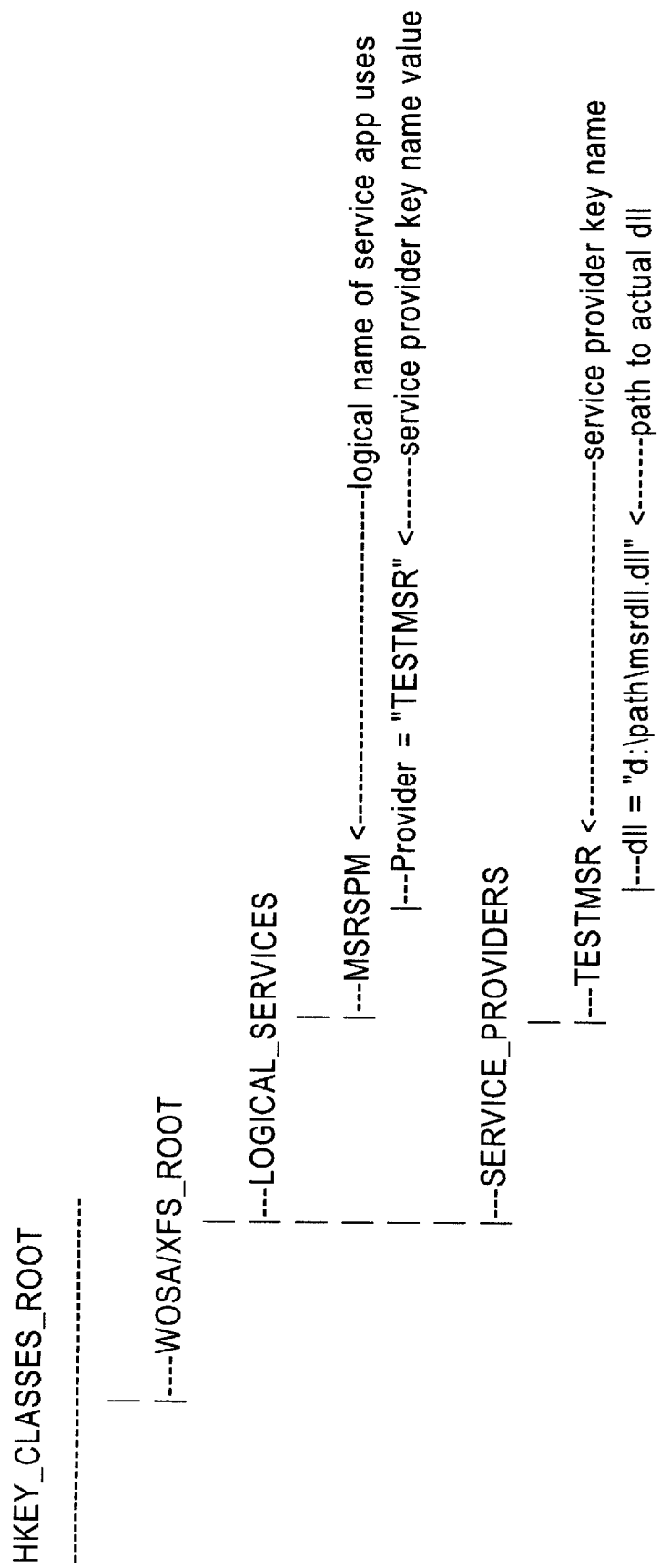
FIG. 4 is a schematic view of a portion of a Windows NT registry employed by a WOSA manager.

The Windows NT registry is a hierarchy of keys, FIG. 4, each key containing one or more data values. The WOSA Manager 20 uses the system provided HKEY_CLASSES_ ROOT key to store and obtain data on Logical Service Providers, for example, "msrspm". The application 10 opens a service by providing the WOSA manager with that services' logical name. The manager finds the key entry, "msrspm" in the HKEY_CLASSES_ROOT\WOSA/XFS ROOT\LOGICAL_SERVICES key for that service. One of the data fields, "provider", within that key is an entry describing the service provider key name, "testmsr". The manager then accesses the relevant service provider key within the HKEY_CLASSES_ROOT\WOSA/XFS ROOT\SERVICE_PROVIDERS key, which will contain an entry describing the exact path to the physical dll that contains the executable code for that service provider, "d:\path\msrdll.dll".

In the conventional WOSA transaction processing system of FIG. 1, the path to the physical file in the Windows registry will point to a service provider module 30. For service providers who support the alternative server model of FIG. 2, the path points to a stub DLL 35. This stub DLL 35 will thus direct any WOSA transaction requests across the process boundary to the server 40 as described above. If some vendor devices do not support the alternative server model, because they do not provide stub modules, then their respective SPMs can communicate directly with the WOSA manager 20 within the same process, as in the case of the SPM 37 in FIG. 2 (the filter 36 can be ignored for the moment and will be explained later).

Figure 5:
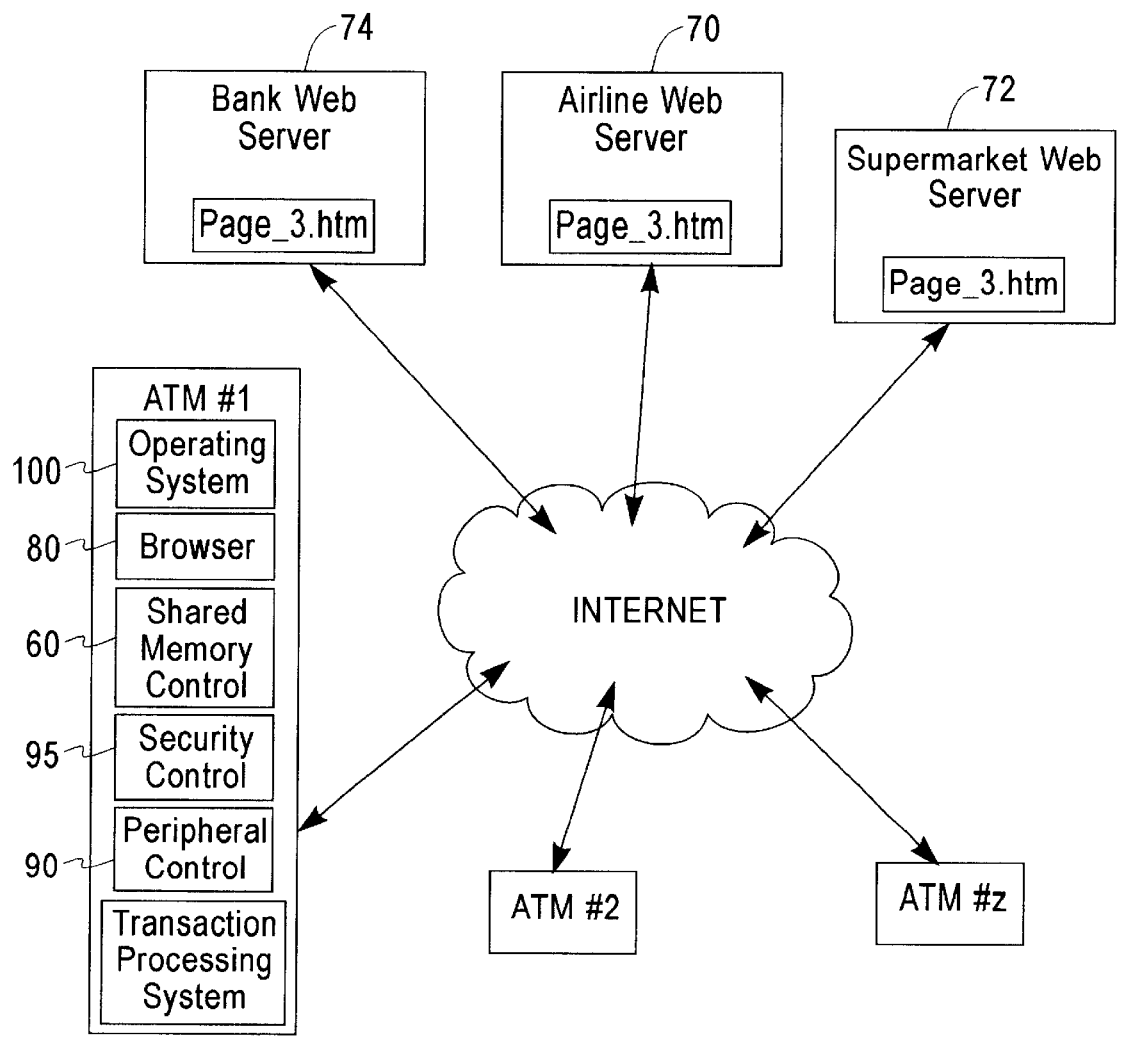
FIG. 5 is a schematic view of a set of web ATMs including a transaction processing system according to an aspect of the present invention.

The above description has extended only to traditional applications running on an ATM. There exists a demand now for ATMS to provide more than simply banking services by enabling users to conduct all types of transactions on an ATM. FIG. 5 shows a web ATM (Automatic Teller Machine) which includes a PC compatible computer or at least a computer of this power, appropriate Internet browser software 80, for example Internet Explorer from Microsoft, compatible ATM operating system software 100 for example Windows NT from Microsoft and a transaction processing system according to the model of FIG. 1 or FIG. 2. The ATM may have a touch screen or function buttons (not shown) allowing a sophisticated level of interaction between the user and an ATM Application. In the present embodiment, the browser 80 takes the place of the application 10 of FIGS. 1 and 2, and runs a Bank ATM Application written in the form of a page, Page__1.htm, or series of pages located on a bank web server 74 (or cached on the local machine). The bank application, via its web pages, can prompt a web ATM user to swap web pages within the bank web site or to swap to web pages of any other web sites, for example, an airline web page, Page__2.htm, located at an Airline Web Server 70 or a supermarket web page, Page__3.htm, located at a Supermarket web server 72.

In a web ATM, there is a requirement for such Internet Banking and Financial Services Applications, to keep information (such as account details, PIN numbers etc.) available and secure when a user swaps between web pages. The user may swap pages within a site, for example, when conducting on-line banking and swapping from one account transaction to another; or when a user swaps between pages on different sites such as from their bank's web site to a utility, supermarket or airline web site. It is important, if such inter- or intra-site commerce is to be conducted, for data relating to the user to be persistent between web pages, because requesting the user to enter a card number or PIN multiple times is not viable from a usability viewpoint.

The present embodiment provides a ACTIVEX or JAVA-BEAN memory controller component 60 that can be attached to a web page written using the JAVASCRIPT or VBSCRIPT extensions to HTML (hyper-text mark-up language), or the JAVA language, to store and retrieve variable data, in either secure (encrypted) or insecure (clear) modes. Other web pages, that can reside on other servers, can also access this data via their own instance of the memory controller component, providing an easy to use and secure method of transferring sensitive data between pages.

The memory controller 60 will be described in terms of ActiveX controls for an Internet Explorer web browser from Microsoft, although it will be seen that the invention is applicable to other languages, web browsers and operating systems, for example, JAVA and JAVASCRIPT, Netscape and OS/2.

Figure 6:
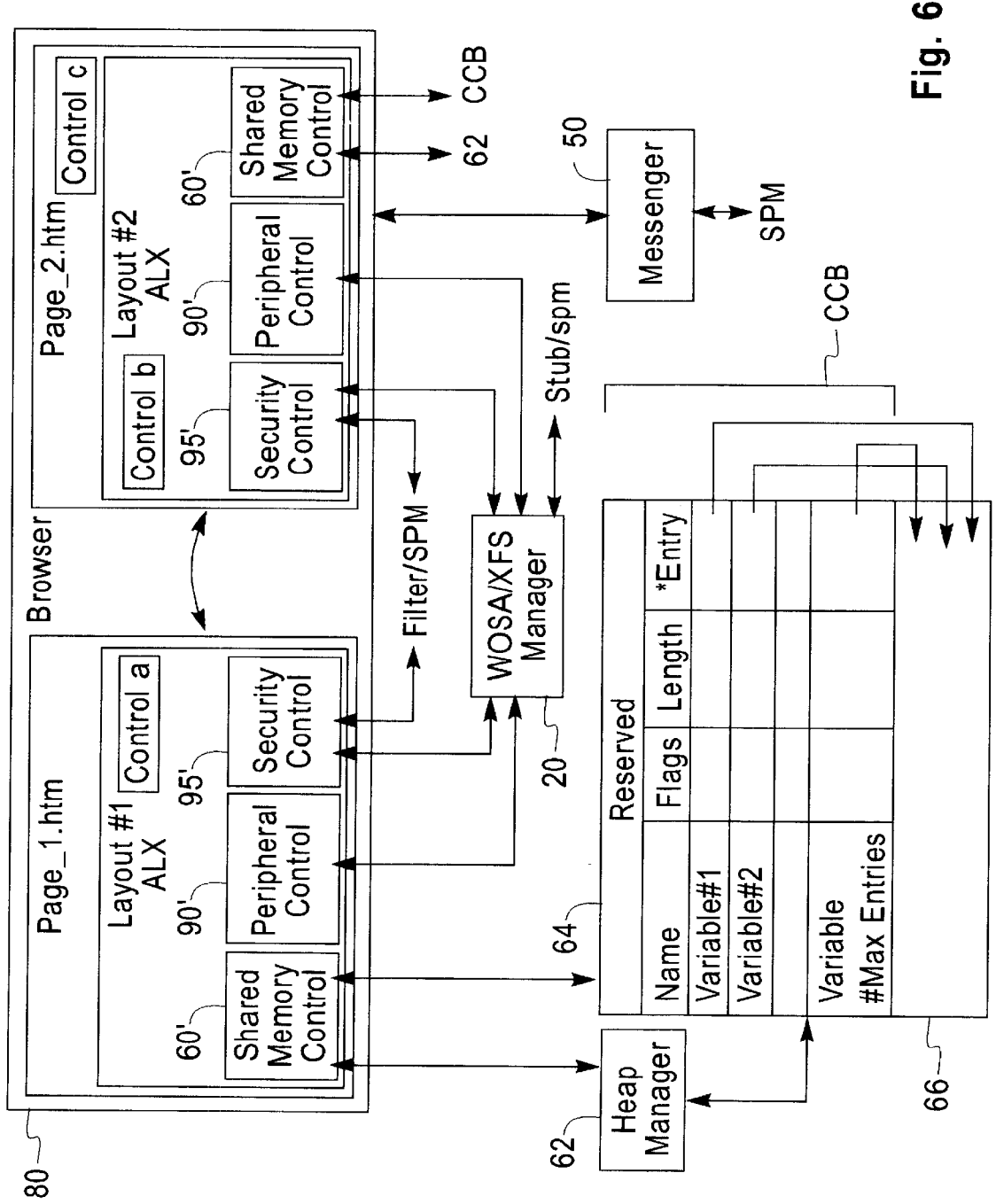
FIG. 6 is a schematic view of a set of Internet Applications employing a peripheral controller component and a security controller component operable with the transaction processing system according to the present invention.

Turning now to FIG. 6, the memory controller component 60 manipulates an area of shared memory 64 allocated by a first instance of the component 60' and manipulated by subsequent instances of the component. The component can be instantiated directly from a HTML file, or alternatively as with the instances 60', the component can be instantiated from a script file, for example, layout#1.alx which in turn is included in Page__1.htm or Page__2.htm. Including a script file in a HTML file can be achieved, for example, by using the following syntax:

<OBJECT CLASSID="clsid:nnnnn ID="Html__
   Layout1" STYLE "LEFT:0pt;TOP:0pt">
<PARAM NAME="ALXPATH" REF VALUE="d:\. . .
   \layout#1.alx">
</OBJECT>

The CLASSID attribute specifies the type of component that is to be loaded: "clsid:" indicates an ActiveX control; whereas "java:" would indicate a Java applet. "clsid:" is followed by an ActiveX control's registry key number "nnnnn". This key uniquely identifies the particular Activex control and is the same on every Windows'95 and Windows NT 4 machine. <PARAM..> tags are parameters, passed to the ActiveX control, to determine, for example, how the control is to present itself. In this case the ActiveX control "nnnnn" for laying out a page is passed a reference to the location of the script file layout#1.alx located on a local D: drive on a machine running the browser.

In either case, the syntax for instantiating a memory controller component 60, in this case called MemoryControl, from either the HTML file or the ALX file is, for example:

<OBJECT ID="MemoryControl" CLASSID=
   "clsid:xxxxx
   STYLE
"TOP:0pt;LEFT:0pt;WIDTH:75pt;ZINDEX:0;">
<PARAM NAME= . . . >
</OBJECT>

In this case "xxxxx" represents the key number for the memory controller ActiveX control. This control 60 resides in an .OCX file on the local disk on the browser machine and is registered for use with any web pages that need to use the memory controller. It should therefore be seen that, in the ActiveX embodiment, the script file or HTML file only includes references 60' to the memory controller or any of the other Controls a, b or c, and that the software for the controls is actually stored on a local disk. In an JAVA embodiment, however, Applets are downloaded every time a page is accessed.

Instantiation of an ActiveX control exposes a number of methods, which can be called from within the HTML file or the ALX file, by prefixing the name of the method with the OBJECT ID. Thus, a method is called using the following sample syntax:

<SCRIPT LANGUAGE="JavaScript" FOR "Enable"
   EVENT="Click( )">
<!--
MemoryControl.abcd=1;
// -- > where "abcd" is the name of the method. In this example, a button called "Enable" has a "click" event. The button could, for example, be any one of Controls a . . . c included in a web page using the <OBJECT> tag described above. The button is displayed when the HTML page is downloaded and, when clicked by the user, calls the method "abcd", setting its state to "1".

The methods exposed by the memory controller according to the present embodiment are as follows:

Connect(NewValue)
SetVariable(VariableName, ValueName)
GetVariable(VariableName)
Storekey(KeyNumber, KeyValue)
SetVariableEnc(VarName, ValueName, KeyNumber)
GetVariableEnc(VarName, KeyNumber)
EncryptKey(KeyTarget, KeySource)
DeleteAll( )
DeleteKey(KeyNumber)

Connect is passed a variable NewValue. This has a value "1" to indicate a web page wishes to connect to shared memory 64 and a value "0" to indicate a web page wishes to disconnect from shared memory. When connect is called with NewValue="1", it first checks to see if a heap manager program 62 has been instantiated, if not the heap manager is instantiated. The heap manager, when instantiated allocates a named area of shared memory, in the present embodiment 4 Mb in size. In Windows NT, this is done using a system call "CreateFileMapping", whereas in OS/2 two system calls are needed, "DosAllocSharedMem" to check if the named memory has been allocated and "DOSGetNamedShared-Mem" to allocate the named memory.

The named shared memory 64 contains a component control block (CCB), plus a large area of 'heap' space 66 to store data. The CCB is mostly taken up with an array of control structures that specify details of individual variables stored by the component. Each structure contains:

1. The name of the variable, up to a finite length.
2. The length of the variable data (for encryption)
3. A control flags field for internal usage.
4. An internal offset pointer to where the data resides.

Space is allocated for a finite number, Max Entries, of these structures, preferably several thousand. The heap manager 62 preferably allocates the space using a virtual memory page file of the operating system, so that efficient management of the memory used, ie. paging in and out of physical memory, is under the control of the native operating system.

Once the heap manager 62 is instantiated, the connect method can check a reserved field in the CCB. If this field contains a pre-determined string value, then connect knows the CCB has been initialised. If not, then the contents of the CCB array is cleared.

Further instantiations of the shared memory controller 60 will also seek to connect their respective web pages to shared memory 64. In these cases, however, when connect is called, the further instantiation will see that the named shared memory has been allocated and so all these web pages need is the start address of shared memory 64. Each web page application can then call the remaining methods to manipulate the shared memory 64 as required.

SetVariable is used to store variables in unencrypted format. Variables are stored or retrieved by setting the VariableName and ValueName parameters and calling SetVariable. ValueName, ie. the variable data, is preferably passed as an ASCII string, terminated with a null character. SetVariable checks the validity of the properties and if acceptable, the CCB array is checked to see if a variable of that name is already in existence. If it is, then the memory already allocated to the existing data is freed and a new allocation request is made to the heap manager 62 for a memory block of the size required to hold the new data. The heap manager 62 allocates memory from the heap 66 of shared storage and its real address is modified to show just the offset from the start of shared memory 64 storage. It is this offset which is then stored in the CCB array.

This technique is employed because the shared memory 64 may not exist in the same address location in the different web page processes that attach to the shared memory 64. The 'real' address of any specific variable data will therefore be different for each process, however, if each process knows what the base address of its instance of shared memory is, its instance of the memory controller component 60 can calculate at run time what the 'real' address of the required variable data is by adding that to the stored offset of the variable data in the CCB.

GetVariable is the retrieval method corresponding to SetVariable. By simply setting VariableName, GetVariable can search the CCB for the variable's offset address within the heap 66 and return the variable data at this address in the form of a string to the calling script.

StoreKey stores keys used by other methods as volatile keys (ie they cannot be saved and are not persistent) in binary format in the Windows NT registry HKEY_CLASSES_ROOT key, using a non-obvious nomenclature within the key. Keys are stored as binary values, but are passed into StoreKey as a hexadecimal representation in ASCII, ie "0123ABCD". StoreKey then manipulates the data into binary 0x0123ABCD prior to storing the key in the Windows registry.

It will be seen that, because they are volatile, any stored encryption keys will be lost once the local machine is turned off. Thus, a page can set encryption keys on the local machine during a browser session with little possibility of the keys being recovered by unauthorised users.

It will be seen that where hardware encryption can be used, encryption keys would be stored in the physical device used for the encryption functions.

SetVariableEnc corresponds to SetVariable but is used where data is to be encrypted before being stored in shared memory 64. The KeyNumber property is set to the required encrypt key number prior to calling SetVariableEnc. In the case of an encrypted variable, the process is the same as for Setvariable except that the variable data is encrypted or decrypted using either the DES or RSA algorithms and the key specified in the KeyNumber property prior to calling the encrypt method.

GetVariableEnc allows a script to recall encrypted variables, by setting the KeyNumber with which the variable was encrypted. If the incorrect key number is used then garbage will be returned, or if GetVariable is used to try and recover an encrypted variable, a null value will be returned.

Encryptkey allows the user to encrypt or decrypt keys multiple times prior to their use. There are no methods for retrieving keys, so a potential hacker would have to have access to the local machine the memory controller component was running on in order to stand any chance of finding the encryption keys in use.

DeleteAll deletes all encryption keys from the Windows registry and DeleteKey deletes the key specified by KeyNumber.

Using the shared memory controller enables smooth inter-site electronic commerce. For example, page_1.htm, a bank web page, can be designed to take a user's account details and verify the user's identity by, for example, getting the user to set PIN number or other secret details, which can be stored in singly encrypted or multiply encrypted format on a local machine. It should be noted that at this stage the user's information need not be transmitted to the bank and can remain only on the local machine, ATM#1 . . . #z for access at a later time by bank web pages or web pages from other compatible sites.

The user can be prompted by the bank web page to swap web pages within the bank web site or to swap to web pages of any other web sites who also employ a shared memory controller according to the invention. The pages for these web sites can now look at any data set by the user when at the bank web page and can, for example, verify to the other web site that the identity or the credit limit of the individual is valid. It will be seen that, unlike the 'cookie' protocol, the domain name of the web server for other sites from which, for example, Page_2.htm is received, need not be related to the domain name for bank site from which Page_1.htm is received.

In the present embodiment, at least one page of the bank ATM application will include a reference 60' to the controller 60 to connect the browser to shared memory 64 and expose the methods described above.

Each ATM#1 . . . z further includes at least one further Activex control 90 which, when referenced in a web page 90', exposes methods for controlling ATM peripherals (not shown) such as a printer, keypad, magnetic stripe reader etc.

Figure 7:
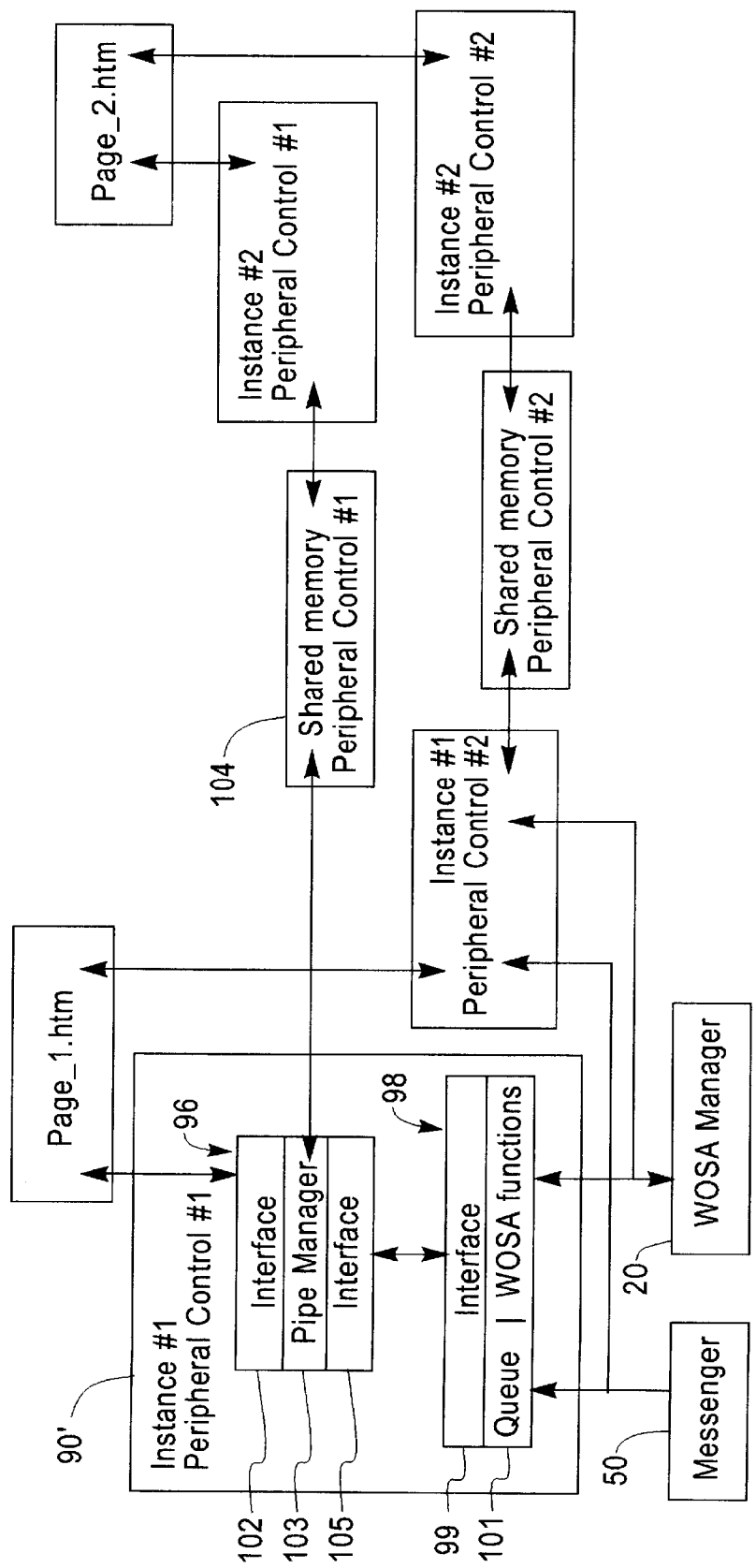
FIG. 7 is a detailed schematic view of a peripheral controller component of FIG. 6.

Each peripheral (device) controller object consists of two layers, an upper component layer 96 and a lower device layer 98 compiled either as an ActiveX Control or Javabeam component according to the implementation environment, FIG. 7.

The lower device layer 98 is designed to remove the complexities of WOSA functions from an application developer. Executing a WOSA transaction request can entail making a series of WOSA function calls, when in fact an application developer might simply wish to, for example, "read a PIN number" or "write to the display". The device layer: provides a class hierarchy that encapsulates all WOSA device functions into a simpler interface 99; handles the Windows messaging environment by maintaining a private queue 101 for the peripheral to store events retrieved from the operating system messenger 50; and breaks down complex WOSA data structures into more readily manipulated data blocks. The methods 99 exposed by each peripheral controller's device layer are utilised by the associated component layer 96 to provide device functions 102 for instantiations of ACTIVEX or JAVABEAN peripheral controller components within a web page, Page_1.htm or Page_2.htm.

The upper component layer 96 includes: a) pipe manager 103 which manages a shared memory control block 104 associated with the peripheral control, utilising the memory 'pipe' class, explained in relation to the server 41 and stub modules 35 above (This allows different processes, ie. web pages, having different instantiations of the same peripheral control to access the same piece of data to monitor or initiate transaction requests); and b) an interface 105 to the device specific methods of the device layer.

When a second instance of a peripheral control is instantiated from another web page, it's constructor determines that a shared memory control block 104 has been initialised by the first instance of the control. In this case, the second instance does not instantiate a device layer 98, rather it simply instantiates a memory pipe object 103 to read, write and monitor the shared block 104.

A separate thread monitors the event queue 101 for a device and fires device specific events to the component layer when an event message is received from the operating system messenger 50. The shared memory block 104 is utilised to keep accurate track of the status of the device, as each web page that utilises the component will have a different instance of the component layer 96, though the device layer 98 is only instantiated once. Any status change is therefore available to any of the instances of any peripheral controller.

In operation, the ATM Application pages include an appropriate user interface, so that a user is first prompted to insert a card into the magnetic stripe reader. The ATM Application pages are able to call methods exposed by peripheral controllers 90 for reading the users card and PIN number, for example, thus verifying the user's identity. The ATM Application can write information to shared memory 64 such as the user's available credit limit using methods exposed by the shared memory control 60, as well as control hardware an instance of a given peripheral control.

The ATM Application can then prompt the ATM user to swap to other sites by, for example, displaying buttons on the ATM screen which can be touched by the user to select a site. By swapping to other sites, for example, an Airline booking system site 70, the user can for example select a flight and pay for the flight directly from the ATM using the user's bank account information already stored in shared memory. Other sites could be utility company sites, at which the user could pay a bill, or supermarket sites 72, at which a user could cash in loyalty points. Thus, in one transaction a user, as well as inserting a credit card, could also insert an air miles card which can also be read by the ATM magnetic stripe reader. The user could cash in loyalty points for air miles at their supermarket site 72 and then swap to an airline site 70 and pay for a ticket using these air miles, all without entering information more than once.

It will be seen that, because several stages may be involved in any particular transaction using an ATM according to the invention, appropriate transaction processing methodology, for example two-phase commit, should be employed when updating resources such as a user's balance, air miles total etc.

It will also be seen that the transaction processing system of either the model of FIG. 1 or FIG. 2 can operate with more than one application 10 at any given time or, in the case of a web ATM, many web applications can run through the web browser 80 along with conventional applications 10. Many WOSA installations include sensitive peripherals, for example, an ATM includes a cash dispenser. If a rogue application were to gain access to the ATM, then it is possible that the application could, for example, instruct the cash dispenser to dump its contents. The application could read users account and pin information and print the information from the ATM printer or mail the information across the web. Such rogue activities are not limited to ATMs and it will be seen that this potential for fraud exists for any WOSA installation including sensitive equipment.

A Security Service Provider Module (SPM) 95, FIG. 5, enables a supervisor application to deny to other applications certain services provided by other peripheral SPMs controlling hardware. These SPMs would normally control sensitive devices in an Automated Teller Machine or kiosk, such as the Cash Dispensing unit, the Card Reader or Smart Card Reader, Pin Pad device, Depositor unit and Sensors and Indicators unit. A supervisor application 10 or web application, running within the browser 80, controlling the security module 95 can effectively lock access to these sensitive devices and restrict which other applications can gain access to them. This locking is over and above a conventional WOSA WFSLOCK command that is an optional command and can in any case be circumvented by a rogue application.

The Security Module provides, inter alia, the following commands, to the supervisor application:

REGISTER_SUPERVISOR_APPLICATION(Process ID) returns a unique SA key for use in later commands. Process ID is the application registering as the Supervisor.

DEREGISTER_SUPERVISOR_APPLICATION(SA key).

ALLOW_DEVICE_ACCESS(SA key, HSERVICE, function code); and

DISABLE_DEVICE_ACCESS(SA key, HSERVICE, function code).

Whenever an application issues a WFSOPEN command to a service provider module, a session handle HSERVICE, is returned to the application. Function code may be one of the following, divided according to device:

(Cash Dispenser Module)
 CDM_DISPENSE
 CDM_SET_TOTALS
 CDM_SET_CASH_UNIT_DETAILS
(Sensors and Indicators Unit)
 SIU_DISABLE_SENSORS
 SIU_DISABLE_EVENTS
(Deposit Unit)
 DEP_RESET_COUNTS
(Identification Card Device Class)
 IDC_WRITE
 IDC_RESET_COUNTS
 IDC_CHIP_IO
 PIN_READ_KEYSTROKES The above commands are called as parameters for the WOSA WFSEXECUTE command.

QUERY_DEVICE_ACCESS(SA key) returns HSERVICE.

This function enables the SA to query the state of the various locks by issuing the command as a parameter for the WOSA WFSGETINFO command.

In operation, an application 10 or a web application, page_1.htm, connecting to the Security Module 95 first registers itself as a Supervisor Application (SA), ie the application that can make decisions on the accessibility of the various sensitive devices. The transaction processing system has a default startup setting of inactive, that is, anyone can get access to anything as per the normal rules of WOSA. Only one application can be registered as the Supervisor Application, any others attempting access will be rejected. Any other applications wishing to use sensitive devices must communicate with the supervisor application and request access to devices.

Applications identify themselves to the supervisor application using HSERVICE and negotiate with the supervisor application in relation to the activities they wish to conduct in relation to sensitive devices. For example, an application may seek to be able to dispense cash from a cash dispenser and will thus need a level of access sufficient to call any cash dispensing functions. The mechanism by which the supervisor application negotiates the relevant permissions with other applications is not relevant to the current invention and can be conducted by any number of conventional techniques.

Take, for example, a supervisor application and another application running within the model of FIG. 1 or FIG. 2. The supervisor application first calls: WFSEXECUTE (REGISTER_SUPERVISOR_APPLICATION(Process ID)) and receives an SA key. The other application opens access to a cash dispenser SPM using the WFSOPEN command and obtains a HSERVICE=1. The other application negotiates with the supervisor application to get access sufficient to set cash dispenser totals. The supervisor application then calls: WFSEXECUTE(ALLOW_DEVICE_ACCESS(SA key,1,CDM_SET_TOTALS)) to update a table 97, FIG. 1, with the appropriate information. The other application continues by making a call to the cash dispenser SPM to dispense money. The cash dispenser SPM 30, or a filter 36 corresponding to a non-compliant cash dispenser SPM 37, receives the call from the WOSA manager, FIG. 1, or through the server 40, FIG. 2, and then checks with the security module 95 by passing the HSERVICE identity of the application and the required function code to the security module. The security module then uses the internal table 97, FIG. 1, to return negative to the SPM or filter, because the calling application does not have the required level of access. The SPM 30 or filter 36 will thus return WFS_ERR_UNSUPPORTED_COMMAND to the application. The application will then need to negotiate with the supervisor application to obtain the appropriate access rights or be denied access. On the other hand, if the application were allowed access, then the filter 36 would pass the cash dispense call to the SPM 37 or the SPM 30 would execute as normal and respond accordingly to the application via the WOSA manager 20 or operating system messenger 50.

In the model of FIGS. 2 and 3, the server 40 contains all compliant device SPMs inside one single discrete entity. Any request to a device covered by the Security Module is checked by the device SPM 30 running in the server 40 process, FIG. 3, to see if the HSERVICE of the requesting application is allowed to call the target function.

In the model of FIG. 1 or where hardware vendors do not support the model of FIG. 2, but their SPMS's 37 are written in the standard SPM format, the service provider layer includes 'filter' DLLS 36 inserted between the WOSA manager and the vendor SPMs 37. This is achieved by Windows NT Registry entries, FIG. 4, that point both WOSA Manager 20 to the filter DLLS 36 and the filter DLLS to their associated SPM's 37. The filter DLLs 36 connect to both the vendor SPMs 37 and the Security Module 95. Any commands passed through the WOSA Manager 20 from a calling application are checked by the filter DLLs 36 and either rejected or passed through to the original vendor SPM 37. The vendor SPM is unaware that anything has happened and takes no part in the checking procedure.

In order for the security module to be operable from a web application, it must be compiled as an ActiveX Control or Javabean component 95 residing on the local browser machine, for example, ATM#1 . . . ATM#z, FIG. 5. The control is instantiated from a web page 95', FIG. 6, in the same manner as the shared memory control 60 and peripheral control 90, to expose the methods described above to the calling web page.

The above description discloses several controls 60, 90 and 95 which can be instantiated from a web application. It will be seen that many variations of control may be developed to achieve different functions within a web application.

For example, it is useful in a web ATM, for a web application to be able to determine if a transaction request has failed to complete within a given time. In a variation of FIG. 5, the ATM includes a timer component (not shown) which can be instantiated from a web page in the same manner as the components 60, 90 and 95. The timer component exposes methods which enable an application to specify that it be notified after a given time lapse, and further after given time intervals. Thus, if an application requested the user to withdraw a card from the ATM card reader, a timer method could be called to notify the application after five seconds. If the application had not been notified of completion of the card withdrawal, it could send a request to retract the card into the card reader.

It is also useful for an application to be able to write error log or other similar information to the hard disk of the local machine in the event of serious failure or for statistical analysis purposes. It may also be desirable to enable an application to, for example, update or read entries in the Windows registry, FIG. 4. Other controls could therefore be provided to allow this functionality within a web application.

What is claimed is:

1. A security system for a transaction processing system in which a transaction manager runs in a first process and is responsive to transaction requests from one or more applications and a service provider layer is adapted to relay transaction requests passed from said transaction manager to associated hardware for execution; said security system comprising:

a security module adapted to store application rights to execute transaction requests; and a supervisor application adapted to register with said security module, said supervisor application being adapted to communicate with the one or more application to determine application rights to execute transaction requests and to store said rights in said security module;

wherein the security module is responsive to requests from the service provider layer to determine an application's right to execute a transaction request.

2. A transaction processing system including:

a transaction manager running in a first process and responsive to transaction requests from one or more applications;

a service provider layer including a set of service provider modules, each service provider module being adapted to relay transaction requests passed from said transaction manager to an associated hardware module;

a security module adapted to store application rights to execute transaction requests;

a supervisor application adapted to register with the security module, said supervisor application being adapted to communicate with the on or more application to determine application rights to execute transaction requests and to store said rights in said security module;

wherein said service provider layer is adapted to communicate with said security module to determine if an application has appropriate access rights before executing a transaction request.

3. A transaction processing system according to claim 2 wherein one or more of said set of service provider modules has an associated filter, the or each filter being adapted to communicate with said security module to determine if an application has appropriate access rights before transmitting a transaction request to an associated service provider module for execution.

4. A transaction processing system according to claim 2 wherein one or more of said set of service provider modules is adapted to communicate with said security module to determine if an application has appropriate access rights before executing a transaction request.

5. A transaction processing system according to claim 2 including:

a set of stub modules adapted to run in the same process as the transaction manager, each stub module being adapted to relay transaction request data passed from said transaction manager across a process boundary;

a server adapted to run in a second process, said server being adapted to receive requests from said set of stub modules across the process boundary and to queue said requests for execution by said set of service provider modules;

each hardware module corresponding to a stub module and being responsive to said queued requests to convert said queued requests to respective hardware specific calls for a device associated with each hardware module.

6. A transaction processing system as claimed in claim 5 wherein said transaction processing system is implemented on a Windows NT operating system, said operating system including a Windows registry, wherein said stub modules are implemented as stub dynamic link libraries which are adapted to be registered in the registry and wherein said transaction manager is adapted to call said stub DLLs by using information obtained by a lookup process performed on the Windows registry.

7. A transaction processing system as claimed in claim 6 wherein said transaction manager is a windows Open System Architecture (WOSA) manager, said transaction requests are WOSA calls and said manager is adapted to relay said WOSA calls to said server via said stub modules, said server being adapted to convert said WOSA calls into constituent components, each component corresponding to a low level generic hardware function call.

8. A transaction processing system as claimed in claim 2 wherein one of said applications is a web browser adapted to run a web application, the web application including one or more web pages, said security module being adapted to be instantiated from a web page.

9. An Automatic Teller Machine including the transaction processing system as claimed in claim 2 comprising:

a. a processor connected to b. a memory, c. a screen display, d. a user input means, e. a card reader, and f. a storage medium, said storage medium being adapted to store said transaction processing system and operating system software.

10. An ATM as claimed in claim 9 wherein one of said applications is operable to request user input from said user input means and to request data to be read from a card inserted in said card reader and one of said set of service provider modules is adapted to communicate with said security module to determine if said application has appropriate access rights before executing such transaction requests.

11. An ATM as claimed in claim 9 wherein said user input means comprises one or more of a numeric keypad, a set of function keys and a touch screen.

* * * * *